United States Patent
Park et al.

(10) Patent No.: US 10,264,299 B2
(45) Date of Patent: Apr. 16, 2019

(54) METHOD AND APPARATUS FOR TRANSMITTING AND RECEIVING MEDIA DATA IN MULTIMEDIA SYSTEM

(71) Applicant: Samsung Electronics Co., Ltd., Suwon-si, Gyeonggi-do (KR)

(72) Inventors: Kyung-Mo Park, Seoul (KR); Hyeon-Cheol Pu, Hwaseong-si (KR); Jae-Yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/593,435

(22) Filed: Jan. 9, 2015

(65) Prior Publication Data

US 2015/0195588 A1   Jul. 9, 2015

(30) Foreign Application Priority Data

Jan. 9, 2014 (KR) .......................... 10-2014-0003093

(51) Int. Cl.
*H04N 21/236* (2011.01)
*H04N 21/2343* (2011.01)
*H04N 21/434* (2011.01)

(52) U.S. Cl.
CPC ......... *H04N 21/23605* (2013.01); *H04N 21/234327* (2013.01); *H04N 21/4343* (2013.01)

(58) Field of Classification Search
CPC ........... H04N 21/2343; H04N 21/643; H04N 21/23605; H04N 21/4343; H04N 21/234327

See application file for complete search history.

(56) References Cited

U.S. PATENT DOCUMENTS

2003/0138050 A1* 7/2003 Yamada .............. H04N 7/173
                                                              375/240.25
2006/0072559 A1   4/2006 Lecomte et al.
(Continued)

FOREIGN PATENT DOCUMENTS

CN    102860021 A    1/2013
CN    103430561 A    12/2013
(Continued)

OTHER PUBLICATIONS

Kyungmo Park et al.; "Study of iSO/iEC CD 23008-1 MPEG Media Transport"; International Organization or Standardization Organisation Internationale de Normalisation; ISO/IEC JTC1/SC29/WG11 Coding of Moving Pictures and Audio; Oct. 2012; Shanghai, China; XP055306392.

(Continued)

*Primary Examiner* — Hai V Tran
*Assistant Examiner* — Tien M Nguyen
(74) *Attorney, Agent, or Firm* — Jefferson IP Law, LLP (57) ABSTRACT

A method for transmitting media data in a multimedia system is provided. The method includes determining a transport packet header format and a transmission structure that are to be generated based on a transmission requirement of a multimedia service configured by the media data, generating a basic transmission unit of the media data based on the determined transport packet header format and the determined transmission structure, packetizing the media data into at least a packet based on the generated basic transmission unit, and transmitting the packetized media data.

14 Claims, 4 Drawing Sheets

(56) References Cited

U.S. PATENT DOCUMENTS

| | | |
|---|---|---|
| 2007/0003251 A1 | 1/2007 | Chung et al. |
| 2007/0058680 A1 | 3/2007 | Choi et al. |
| 2007/0204050 A1 | 8/2007 | Liu et al. |
| 2008/0313678 A1 | 12/2008 | Ryu et al. |
| 2009/0260041 A1 | 10/2009 | McGinn et al. |
| 2011/0255558 A1 | 10/2011 | Hwang et al. |
| 2012/0320925 A1 | 12/2012 | Park et al. |
| 2013/0094545 A1 | 4/2013 | Park et al. |
| 2013/0095864 A1 | 4/2013 | Marovets |
| 2013/0201316 A1 | 8/2013 | Binder et al. |
| 2013/0297822 A1 | 11/2013 | Park et al. |
| 2014/0007172 A1 | 1/2014 | Rhyu et al. |
| 2014/0282799 A1* | 9/2014 | Bae ................ H04N 21/236 725/116 |
| 2014/0344875 A1* | 11/2014 | Bae ................ H04N 21/2381 725/109 |
| 2015/0089560 A1 | 3/2015 | Park et al. |

FOREIGN PATENT DOCUMENTS

| | | |
|---|---|---|
| JP | 2011-523305 A | 8/2011 |
| JP | 2013-157820 A | 8/2013 |
| KR | 10-2013-0040132 A | 4/2013 |
| KR | 10-2013-0085987 A | 7/2013 |
| WO | 2005/027417 A1 | 3/2005 |
| WO | 2013162312 A1 | 10/2013 |

OTHER PUBLICATIONS

Japanese Examination Report dated Sep. 11, 2018, issued in Japanese Application No. 2016-545846.

* cited by examiner

METHOD AND APPARATUS FOR TRANSMITTING AND RECEIVING MEDIA DATA IN MULTIMEDIA SYSTEM

CROSS-REFERENCE TO RELATED APPLICATION(S)

This application claims the benefit under 35 U.S.C. § 119(a) of a Korean patent application filed on Jan. 9, 2014 in the Korean Intellectual Property Office and assigned Serial number 10-2014-0003093, the entire disclosure of which is hereby incorporated by reference.

TECHNICAL FIELD

The present disclosure relates to a method and apparatus for transmitting and receiving media data. More particularly, the present disclosure relates to data packet generation, a transmission and reception method and an apparatus for transmitting or receiving media data in a multimedia system.

BACKGROUND

In multimedia services, a hybrid network for connecting to both a broadcast network and a communication network, and Moving Picture Experts Group (MPEG) Media Transport (MMT) technology for providing multimedia data including files such as multimedia data to be transmitted, applications, and web pages have been recently developed.

The term 'multimedia service' refers to an interactive service (e.g., video telephony), a streaming service (e.g., a Video on Demand (VoD) service), and a Multicast and Broadcast Service (MBS). Real-time multimedia services may be divided into a call service, an interactive service, and a streaming service depending on the type of service. In addition, the real-time multimedia services may be divided into a unicast service, a multicast service and a broadcast service depending on the number of participating users, and transmission requirements thereof may vary.

MMT technology, which relates to MPEG-based multimedia transmission technology, may be used in place of an MPEG-2 Transport Stream (TS) for broadcasting and multimedia service to multifunctional smart Television (TV), multi-view TV and N-screen devices, and may provide efficient MPEG transport technology in a multimedia service environment that changes based on an Internet Protocol (IP).

In addition, due to the increase in consumption of multimedia data and the development of technology, changes have been made from the era in which only one or two multimedia sources were used, to the era in which multimedia data including various types of multimedia content such as the above-mentioned multimedia data, applications and files have appeared.

The multimedia data may include various types of multimedia content. During transmission of the multimedia data, the multimedia data may be partitioned or converged into multimedia content, and the multimedia content may be transmitted over the integrated transmission network.

For example, multimedia data consisting of applications such as video, audio and widgets may be configured in a data packet and transmitted, taking into account the characteristics of a video signal transmission method, an audio signal transmission method and a file transmission method. The transmitted data packets may be reconfigured into multimedia data in a receiving terminal.

If the multimedia data is transmitted over the network that has been discussed and defined up to now, it is difficult to provide an efficient service suitable for the network environment.

Therefore, it is necessary to configure a multimedia data packet that is based on the characteristics of multimedia data in order to provide an efficient service suitable for the network environment, and a technique for composing and decomposing multimedia content is required to provide a multimedia data packet that is based on the characteristics of multimedia data.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a data packet generation method and apparatus for transmitting media data in a multimedia system.

Another aspect of the present disclosure is to provide a data packet generation method and apparatus for defining information required to transmit Moving Picture Experts Group (MPEG) Media Transport (MMT) packet data header information, payload information and an MMT packet depending on the requirements of a multimedia service.

In accordance with an aspect of the present disclosure, a method for transmitting media data in a multimedia system is provided. The method includes determining a transport packet header format and a transmission structure that are to be generated depending on a transmission requirement of a multimedia service configured by the media data, generating a basic transmission unit of the media data based on the determined transport packet header format and the determined transmission structure, packetizing the media data into at least a packet based on the generated basic transmission unit, and transmitting the packetized media data.

In accordance with another aspect of the present disclosure, an apparatus for transmitting media data in a multimedia system is provided. The apparatus includes a data packet generator configured to select a transport packet header format and a transmission structure based on a transmission requirement of a multimedia service configured by the media data, and to generate a basic transmission unit of the media data depending on the selected transport packet header format and the selected transmission structure and a transceiver configured to packetize the media data into at least a packet based on the generated transmission unit, and to transmit the packetized media data.

In accordance with another aspect of the present disclosure, a method for receiving media data in a multimedia system is provided. The method includes receiving a basic transmission unit that is generated by one packet header format selected from among packet header formats that are determined in advance depending on a number of multimedia constituting the media data, determining a header of the basic transmission unit, and obtaining the media data that is packetized based on the basic transmission unit, using information about the determined header.

In accordance with another aspect of the present disclosure, an apparatus for receiving media data in a multimedia system is provided. The apparatus includes a transceiver configured to reconfigure and receive a basic transmission unit including a packet header format constituting the media data, a header detector configured to determine a header of the received basic transmission unit, and a controller configured to receive the media data that is packetized based on the basic transmission unit, using information about the determined header.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An operation principle according to an embodiment of the present disclosure will be described below with reference to the accompanying drawings.

Although the Moving Picture Experts Group (MPEG) Media Transport (MMT) technology, one of the technologies to which the present disclosure is applicable, will be described herein by way of example, this is merely for illustrative purposes, and it should be noted that the present disclosure is not necessarily applied only to the MMT technology and can be applied to other similar multimedia transmission technologies.

Prior to the detailed description, the basic concept of the present disclosure will be briefly described below.

In embodiments of the present disclosure, a network environment has a connection structure of a server and a client, and refers to an environment in which a dedicated network (hereinafter, referred to as a 'broadcast network') for broadcast and a network (hereinafter, referred to as a 'broadband network') for Internet communication may be provided to the same client, and the client can receive the service over a plurality of networks. In addition, a plurality of network environments may be configured by connecting the broadcast network and the broadband network in parallel, or configured to include a wired or wireless network.

Various embodiments of the present disclosure will be described in detail below with reference to the accompanying drawings.

Specifically, FIGS. 1 through 6, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

Figure 1:
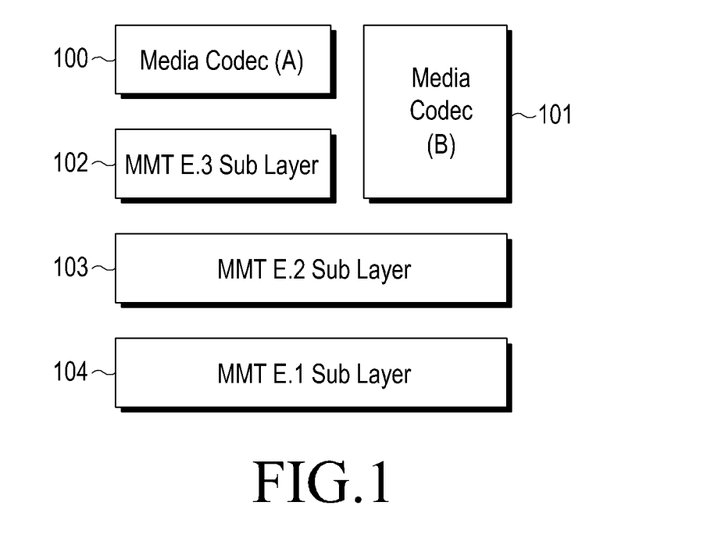
FIG. 1 illustrates layers for processing multimedia content in a Media Transport (MMT) according to an embodiment of the present disclosure.

FIG. 1 illustrates layers for processing multimedia content in MMT according to an embodiment of the present disclosure.

Referring to FIG. 1, an Encapsulation layer (or E layer) is illustrated, where the Encapsulation layer may include one or more of three sub layers. The three sub layers may correspond to a multimedia (media) codec (A) 100, a multimedia (media) codec (B) 101, and an MMT E.3 sub layer 102.

The multimedia codec (A) 100 and the multimedia codec (B) 101 may be different from each other in terms of their function.

For example, in an H.264 codec, a Network Adaptation Layer (NAL) unit that provides characteristic information of multimedia and signaling required for decoding to the digital-compressed video multimedia may be an output of the H.264 codec. As another example, in an H.262 codec, only the digital-compressed video multimedia may be an output of the H.262 codec.

For example, the H.264 codec may be used as the multimedia codec (B) 101, and the H.262 codec may be used as the multimedia codec (A) 100. However, in some cases, the H.264 codec may also be used as the multimedia codec (A) 100. Accordingly, an output of the H.264 codec may further include the information generated in the MMT E.3 sub layer 102.

The MMT E.3 sub layer 102 may generate a Media Fragment Unit (MFU) by receiving various types of multimedia as a source. A function of the MFU is similar to a function of the above-described NAL unit, and may include the priority and correlation information (or dependency counter) within the range of a transmission data unit that can be used to configure a transport packet. However, the MFU may be different from the NAL unit in that the MFU can have, as a payload, all types of multimedia sources such as voice, texts, applications and web pages in addition to the video signal. A function of the MMT E.3 sub layer 102 will be described in detail below in connection with FIGS. 2, 3 and 4.

An MMT E.2 sub layer 103, as illustrated in FIG. 1, may configure a Media Processing Unit (MPU) by collecting various types of MFUs provided from one multimedia source. The MMT E.2 sub layer 103 may generate an MMT asset that constitutes the MPU into one stream.

An MMT E.1 sub layer 104, as illustrated in FIG. 1, may configure an MMT package that can be serviced to the user, using a plurality of MMT assets.

A transmission apparatus according to an embodiment of the present disclosure may configure a basic transmission unit for multimedia data transmission with the above-mentioned MPU and MFU, and transmit the basic transmission unit to a reception apparatus after packetizing it.

An MPU may be configured with MFUs which are the consumable minimum units, and if an independent configuration is possible, the MPU may be configured such that the MPU can be consumed by or delivered to the user in the bundle form of a spatial interval unit. Depending on the transmission environment, it is possible to variably adjust the configuration of the MFUs taking into account the transmission efficiency in one MPU.

In the present disclosure, a method for transmitting multimedia data in a transmission apparatus may include a packet header configuring operation for configuring a packet header and a packet payload configuring operation for configuring a payload of a packet, and the packet header configuring operation and the packet payload configuring operation will be described separately.

A payload of an MMT packet may include a payload header region including configuration information used depending on the transmission environment, and a data region including transmission data. The payload of an MMT packet may be transmitted to a terminal by being included in an MMT transport packet that operates in an environment of Transmission Control Protocol (TCP)/User Datagram Protocol (UDP) which is an Internet Protocol (IP)-based protocol, or by being included in a payload of a Real-time Transport Protocol (RTP) which is an IP.

Figure 2:
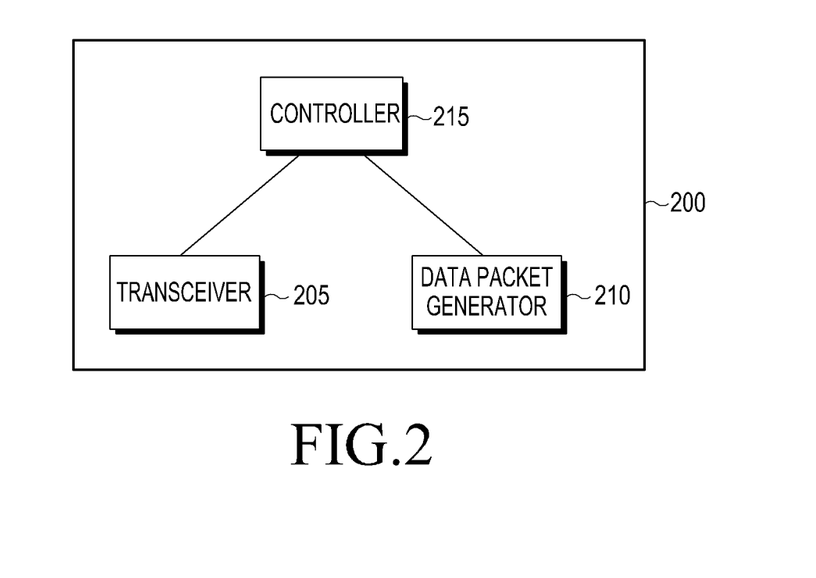
FIG. 2 schematically illustrates an apparatus for transmitting a data packet for carrying multimedia data according to an embodiment of the present disclosure.

FIG. 2 schematically illustrates an apparatus for transmitting a data packet for carrying multimedia data according to an embodiment of the present disclosure.

Referring to FIG. 2, a transmission apparatus 200 is illustrated, where the transmission apparatus 200 may include one or more of a transceiver 205, a data packet generator 210 and a controller 215.

The data packet generator 210 may select one of the MFU header formats that are determined in advance depending on the number of multimedia constituting media data, and generate an MFU of the multimedia data in accordance with the selected header format.

The transceiver 205 may packetize the multimedia data depending on the basic MFU (under instruction of the controller 215), and transmit the packetized multimedia data to a reception apparatus.

The controller 215 may determine whether the number of multimedia is less than a first threshold. If the number of multimedia is less than the first threshold, the controller 215 may select a first MFU header. The first MFU header may include one or more of a Start Flag field of a predefined type indicating the start of the MFU, an MFU Type field indicating the type of media included in the MFU, and a Last Flag field indicating whether the MFU is a first MFU (e.g., 'Start') of specific multimedia data, whether the MFU is a last MFU (e.g., 'End'), or whether a new MFU continues after the MFU (e.g., 'Conti').

If the number of multimedia is greater than or equal to the first threshold, then the controller 215 may determine whether the number of multimedia satisfying the predetermined criteria among the multimedia is greater than or equal to a second threshold. If the number of multimedia satisfying the predetermined criteria is not greater than or equal to the second threshold, then the controller 215 may select a second MFU header. The second MFU header may include one or more of a Start Flag field, an MFU Type field and a Last Flag field. The MFU Type field of the second MFU header may be longer in length than the MFU Type field of the first MFU header.

If the number of multimedia satisfying the predetermined criteria is greater than or equal to the second threshold, then the controller 215 may select a third MFU header. The third MFU header may include one or more of a Start Flag field, an MFU Type field and a Last Flag field, and may further include an MFU Type Extension field. The MFU Type Extension field may indicate the type of media that is included in the MFU by being combined with the MFU Type field of the third MFU header. The Last Flag field of the third MFU header may indicate the presence of the MFU Type Extension field.

It will be apparent to those of ordinary skill in the art that the controller 215, the data packet generator 210 and the transceiver 205 should not necessarily be implemented as separate components, and may be implemented as one component in the form of, for example, a single chip and/or software on the single chip.

Figure 3:
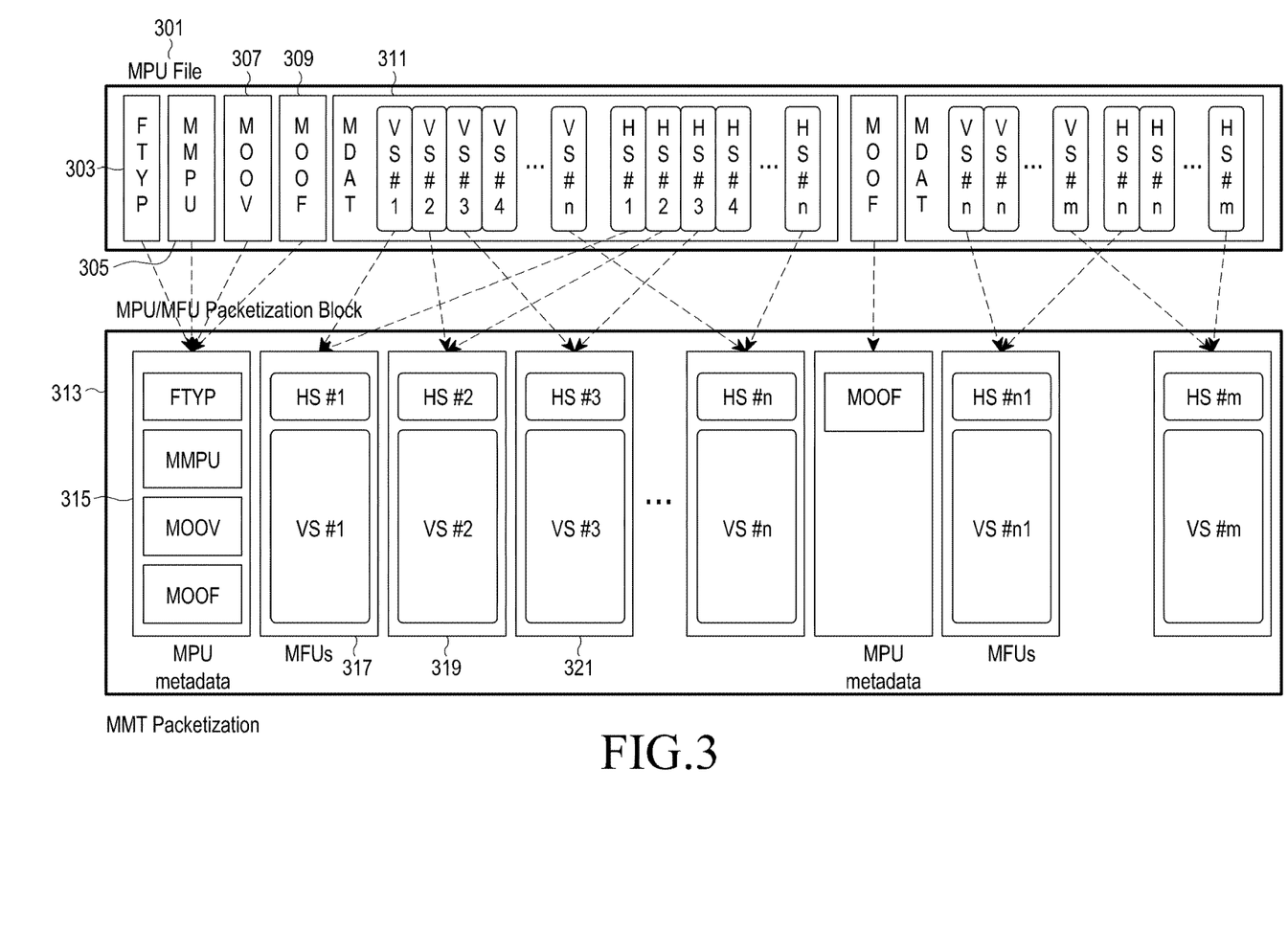
FIG. 3 illustrates a data transmission structure that is variable depending on a service according to an embodiment of the present disclosure.

FIG. 3 illustrates a data transmission structure that is variable depending on a service according to an embodiment of the present disclosure.

Referring to FIG. 3, an MPU file 301 is illustrated, where the MPU file 301 is a file including data that an encapsulation function layer desires to transmit, and an MPU/MFU building block 313 is illustrated, where the MPU/MFU building block 313 corresponds to a data structure for configuring transmission data. The MPU/MFU building block 313 may be referred to as an MPU/MFU packetization block.

The MPU file 301 may include header information such as a File Type (FTYP) box 303 indicating a type of the file, an MPEG Media Processing Unit (MMPU) box 305 indicating the configuration of the MPU, a Movie (MOOV) box 307 indicating the codec configuration information, and a Movie Fragment (MOOF) box 309, and may further include a Media Data (MDAT) box 311 consisting of Video Samples (VSs) and MMT Hint Samples (HSs). The MPU file 301 may include two or more MDAT boxes.

The MMPU box 305 may indicate that the type of the data stored in the MDAT box 311 is MPU, and the MOOV box 307 may contain information about the media frame stored in the MDAT box 311.

The MPU/MFU building block 313 may comprise MPU metadata 315 including one or more of FTYP, MMPU, MOOV and MOOF. Preferably, the MPU metadata 315 may include at least one of FTYP, MMPU and MOOV, thus, MOOF may be included in another metadata (i.e., MOOF metadata). The MPU/MFU building block 313 may comprise and one or more MFUs (e.g., 317, 319 and 321) which are paired with their associated HSs and VSs. For example, HS #1 and VS #1 may be included in one MFU 317, and HS #2 and VS #2 may be included in another MFU 319.

An MMT payload may be configured based on the MPU/MFU building block 313, and may be carried on an MMT packet.

A specific procedure for configuring an MMT payload in a transmission apparatus according to an embodiment of the present disclosure is as follows.

A data packet generator of the transmission apparatus may analyze data of the desired MPU file type, to determine the type, the MPU's configuration information, a codec's setting information, and the data's starting point and size (or length) information, from the header information of the MPU data.

In addition, the data packet generator may analyze the structure of MFUs and MFU HSs constituting MPU data, to determine an MFU header containing the size, mutual priority and interconnection information (e.g., length, etc.) of each MFU, and MFU data which is the actual media data, and may analyze the size of each MFU based on the MFU HS indicating the starting offset and length of each MFU. Based on the analyzed MPU type, the MPU/MFU building block for configuring a transport packet may be configured. The MFU HS may correspond to an MFU header of the building block.

In addition, the data packet generator may configure each MFU as a transmission unit based on the size of each MFU that is analyzed from the MFU HS. Depending on the size of the MFU, one or multiple payloads may be configured. The start, middle and end of each payload may be indicated by a start end indicator which are optional bits. The MPU metadata 315 may also be treated as one configuration unit of the MPU/MFU building block 313.

Figure 4:
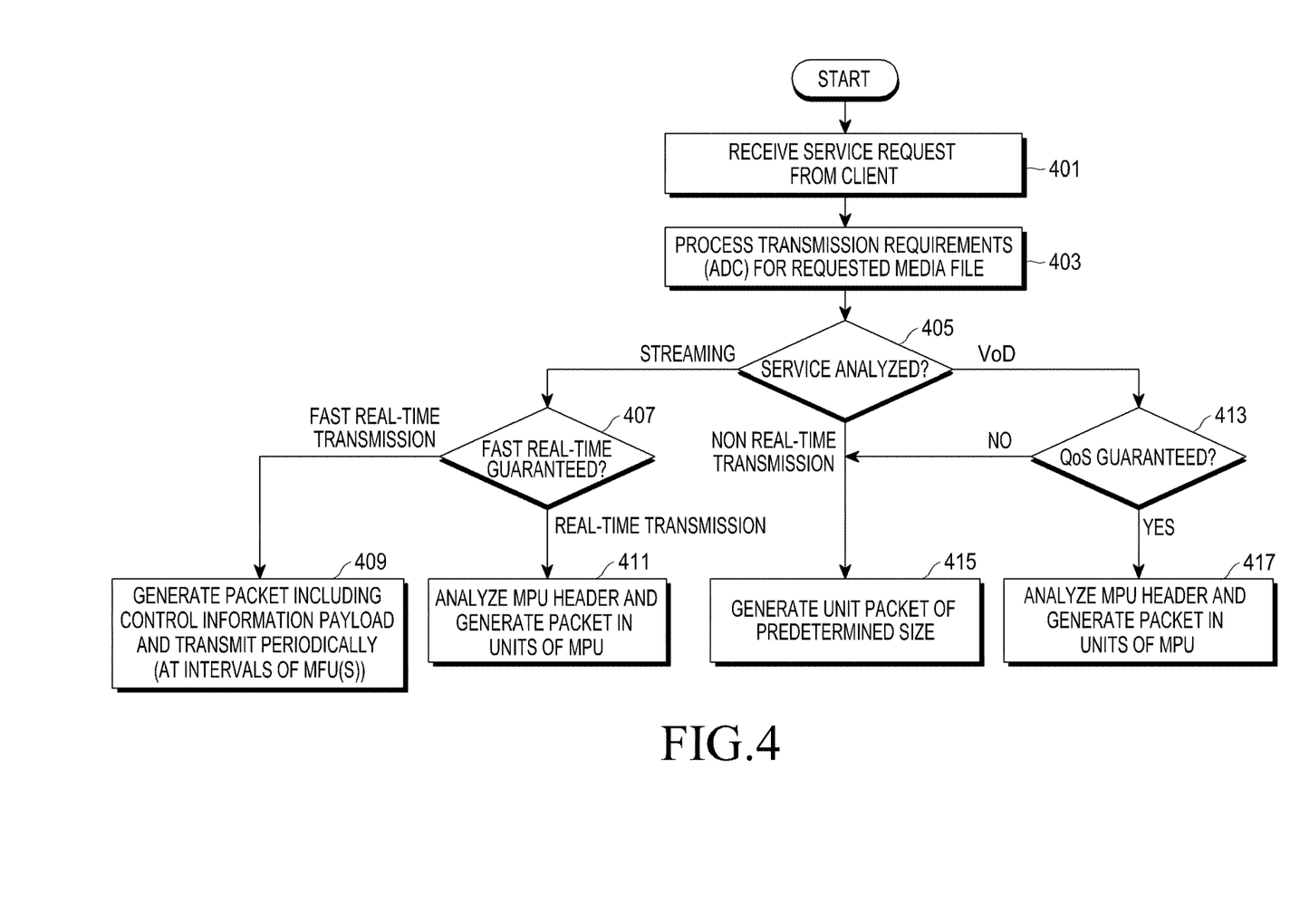
FIG. 4 illustrates an operation of generating a packet of media data according to an embodiment of the present disclosure.

FIG. 4 illustrates an operation of generating a packet of media data according to an embodiment of the present disclosure.

Referring to FIG. 4, in a method of transmitting an MPU of a single size according to an embodiment of the present disclosure, when dividing and transmitting an MPU by analyzing the service requirements, the transmission apparatus may periodically and variably packetize and transmit a control information payload consisting of one or more of FTYP, MMPU, MOOV and MOOF that are necessary for MPU playback. As an example, the control information payload may comprise a MPU metadata including at least one of FTYP, MMPU and MOOV. As another example, the control information payload may comprise a MOOF metadata including MOOF.

As a result, a reception apparatus may play the MPU more quickly. The control information payload may include single information (i.e., a MOOV), and the transmission apparatus may transmit the control information payload by inserting it repeatedly at intervals of one or multiple MFUs.

Variable-length transmission data according to an embodiment of the present disclosure may be divided into a single payload or multiple payloads corresponding to the size of the basic unit depending on the transmission environment, and transmitted on multiple payloads. Each payload may be transmitted by being packetized in its packet. In addition, for the multiple payloads, their packets may be transmitted over a network channel by being multiplexed.

In addition, the transmission apparatus may provide the interleaving function in a predetermined unit taking into account a specific transmission function, and the payload may be defined as a possible general unit structure (or a fairly simple unit structure) of the transport layer. Although, as illustrated in FIG. 4, the transmission apparatus may start a packet generation method for receiving a service request for multimedia from a client and transmitting the requested media data in operation 401, the operation 401 may not occur at all times and may be optional.

In operation 403, the transmission apparatus may perform an operation of analyzing/processing the transmission requirements (e.g., Asset Delivery Characteristics (ADC)) of the requested service.

In operation 405, as a result of the analysis/processing, the transmission apparatus may determine whether the requested service is a service requiring real-time transmission or a non-real-time service. Optionally, in operation 405, the transmission apparatus may determine whether requested service is a Video on Demand (VoD) service.

If it is determined in operation 405 that the required service is a non-real-time service, then the transmission apparatus may generate a unit packet of a predetermined size in operation 415.

If it is determined in operation 405 that the required service is a real-time service (e.g., streaming service), then the transmission apparatus may optionally perform additional determination in operation 407.

In operation 407, the transmission apparatus may determine whether the required service is a service that should guarantee fast real-time transmission. If the required service is a service requiring fast real-time transmission, then the transmission apparatus may generate at least a packet including a control information payload and perform periodical packet transmission (e.g., at intervals of at least one MFU) in operation 409. As an example, the control information payload, which is transmitted periodically in the packet at such a short interval, may comprise a MPU metadata including at least one of FTYP, MMPU and MOOV. As another Example, the control information payload may comprise a MOOF metadata including MOOF. Preferably, the MPU metadata is needed to transmitted more frequently (i.e., at such a short interval) than the MOOF metadata. If the required service does not require fast real-time transmission though it requires real-time transmission, then the transmission apparatus may analyze the MPU header, generate a packet in units of MPUs and transmit the generated packet including the control information payload in operation 411.

If it is determined in operation 405 that the required service is a VoD service, then the transmission apparatus may optionally perform additional determination in operation 413.

In operation 413, the transmission apparatus may determine whether the required service is a service in which Quality of Service (QoS) should be guaranteed. If the required service is a service in which QoS should be guaranteed (e.g., yes in operation 413), then the transmission apparatus may analyze the MPU header, generate a packet in units of MPUs and transmit the generated packet in operation 417. If the required service is not a service in which QoS should be guaranteed (e.g., no in operation 413), then the transmission apparatus may generate a unit packet of a predetermined size and transmit the generated unit in operation 415, as in the case of non-real-time transmission.

Figure 5:
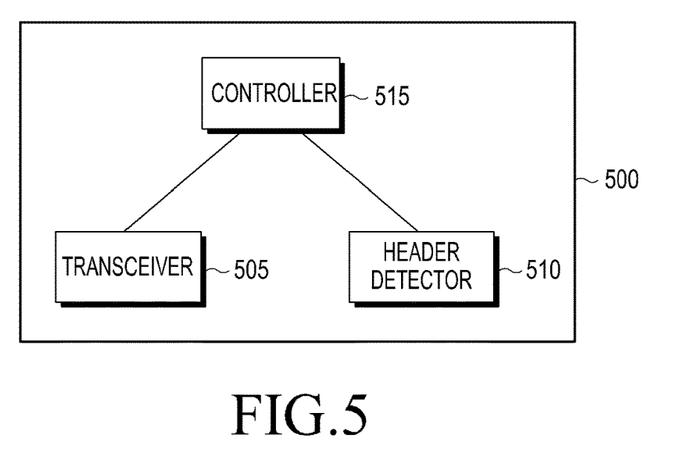
FIG. 5 illustrates a structure of an apparatus for receiving multimedia data according to an embodiment of the present disclosure.

FIG. 5 illustrates a structure of an apparatus for receiving multimedia data according to an embodiment of the present disclosure.

Referring to FIG. 5, a reception apparatus 500 is illustrated, where the reception apparatus 500 according to an embodiment of the present disclosure may perform an operation of receiving a basic transmission unit that is generated by one selected from among the header formats that are determined in advance depending on the number of multimedia constituting the media data, an operation of determining a header of the basic transmission unit, and an operation of obtaining the multimedia data that is packetized depending on the basic transmission unit, using the obtained header information.

The reception apparatus 500 may be configured to include at least one of a transceiver 505 for reconfiguring and receiving a basic transmission unit including a header format constituting media data, a header detector 510 for determining a header of the received basic transmission unit, and a controller 515 for receiving the multimedia data that is packetized depending on the basic transmission unit, using the determined header information.

It will be apparent to those of ordinary skill in the art that the controller 515, the header detector 510 and the transceiver 505 should not necessarily be implemented as separate components, and may be implemented as one component in the form of, for example, a single chip and/or software on the single chip.

Figure 6:
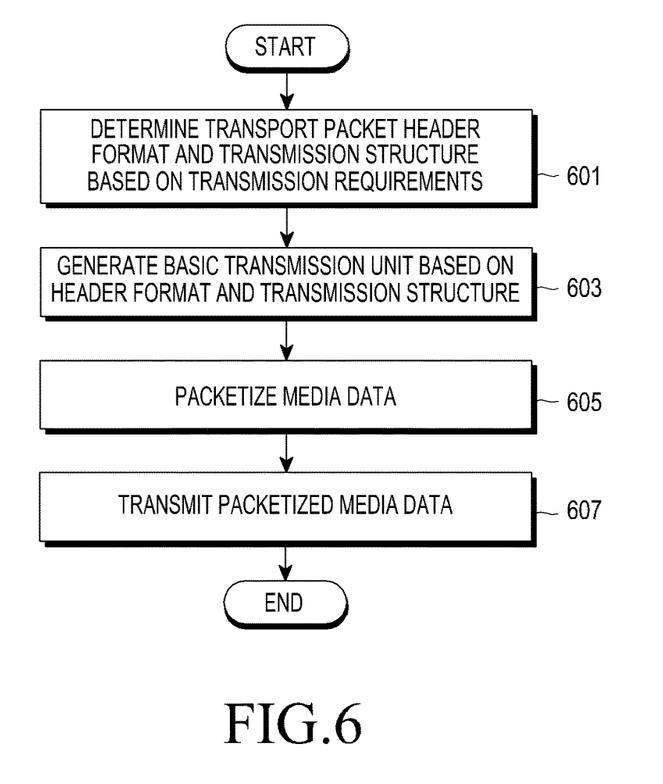
FIG. 6 illustrates a method for transmitting media data in a transmission apparatus according to an embodiment of the present disclosure.

FIG. 6 illustrates a method for transmitting media data in a transmission apparatus according to an embodiment of the present disclosure.

Referring to FIG. 6, in operation 601, a transmission apparatus may determine a transport packet header format and a transmission structure that are to be generated depending on transmission requirements of multimedia configuring media data.

In operation 603, the transmission apparatus may generate a basic transmission unit of the media data depending on the determined header format and transmission structure.

In operation 605, the transmission apparatus may packetize the media data depending on the generated basic transmission unit.

In operation 607, the transmission apparatus may transmit the packetized media data.

It should be noted that the layer configuration, the transmission apparatus and reception apparatus, the data transmission structure, the data generation method and the data transmission method illustrated in FIGS. 1 to 6 are not intended to limit the scope of the present disclosure. In other words, all of data units, specific configurations, or operations shown in FIGS. 1 to 6 should not be construed to be essential components for implementation of the present disclosure, and even though only some data units, operations or components are included, the present disclosure may be implemented without departing from the scope and spirit of the disclosure.

The above-described operations may be realized by mounting a memory device storing a program code in a certain component in a transmission apparatus, a server, a reception apparatus or a terminal device of the communication system. In other words, a controller of the transmission apparatus, the sever, the reception apparatus or the terminal device may perform the aforementioned operations by reading and executing the program code stored in the memory device by means of a processor or a Central Processing Unit (CPU).

Various components and modules of the transmission apparatus, the server, the reception apparatus or the terminal device described therein may be operated using a hardware circuit (e.g., a Complementary Metal Oxide Semiconductor (CMOS)-based logical circuit), firmware, software and/or a hardware circuit such as a combination of hardware, firmware and/or software embedded in a machine-readable medium. For example, various electrical structures and methods may be implemented using electrical circuits such as transistors, transistors and Application Specific Integrated Circuits (ASICs).

As is apparent from the foregoing description, in order to configure a data packet for carrying multimedia data, the present disclosure may define a specific transmission structure for composing and decomposing the data depending on the multimedia content, and may transmit and receive a data packet that is configured based on the transmission structure, thereby making it possible to provide an efficient service suitable for the network environment during transmission of multimedia data.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting media data in a multimedia system, the method comprising:
identifying a packet header format for the media data and a transmission requirement for the media data according to a type of a multimedia service required by the media data;
generating a basic transmission unit of the media data based on the identified packet header format;
packetizing the media data into at least a packet based on the generated basic transmission unit and the transmission requirement;
transmitting the packetized media data; and
determining whether the transmission requirement is for a real-time transmission related to the multimedia service,
wherein, in response to determining that the transmission requirement is for a real-time transmission related to the multimedia service, packetizing the media data includes packetizing the media data into at least the packet by inserting a control information payload therein between consecutive media fragment units (MFUs) at intervals of at least one MFU, and
wherein the control information payload comprises one of file type (FTYP) information, moving picture experts group (MPEG) media processing unit (MMPU) configuration information, or movie (MOOV) codec configuration information.

2. The method of claim 1, wherein, in response to determining that the first control information payload is inserted in the packet at the intervals of at least one MFU the multimedia service requires a faster real-time transmission that is faster than the real-time transmission.

3. The method of claim 1, wherein, packetizing the media data into at least the packet by inserting the control information payload comprises:
generating the packet including the control information payload; and
performing a periodical transmission at the intervals of at least one MFU.

4. The method of claim 1, wherein the control information payload comprises a MPU metadata.

5. The method of claim 1, wherein, in response to determining that the transmission requirement is for a non-real-time transmission related to the multimedia service, then packetizing the media data includes packetizing the media data into at least the packet in a predetermined size.

6. The method of claim 1, wherein, in response to determining that the transmission requirement is for a video on demand (VoD) service related to the multimedia service, then packetizing the media data includes one of:
packetizing the media data into at least the packet in a predetermined size, or
packetizing the media data into at least the packet by inserting a control information payload therein at intervals of at least one MPU.

7. The method of claim 6, wherein packetizing the media data into at least the packet by inserting the control information payload therein at the intervals of at least one MPU is performed, in response to determining that the transmission requirement is for a quality of service (QoS) guaranteed VoD service.

8. An apparatus for transmitting media data in a multimedia system, the apparatus comprising:
a data packet generator configured to:
identify a packet header format for the media data and a transmission requirement for the media data according to a type of a multimedia service required by the media data, and
generate a basic transmission unit of the media data based on the identified packet header format; and
a transceiver configured to:
packetize the media data into at least a packet based on the generated transmission unit and the transmission requirement, and
transmit the packetized media data,
determine whether the transmission requirement is for a real-time transmission related to the multimedia service,
wherein, in response to determining that the transmission requirement is for a real-time transmission related to the multimedia service, then the transceiver is further configured to perform at least one of: packetizing the media data into at least the packet by inserting a first control information payload therein between consecutive media fragment units (MFUs) at intervals of at least one MFU, and
wherein the control information payload comprises one of file type (FTYP) information, moving picture experts group (MPEG) media processing unit (MMPU) configuration information, or movie (MOOV) codec configuration information.

9. The apparatus of claim 8, wherein the transceiver is configured to perform packetizing the media data into at least the packet by inserting the first control information payload by:
generating the packet including the first control information payload, and
performing a periodical transmission at the intervals of at least one MFU.

10. The apparatus of claim 8, wherein, in response to determining that the transmission requirement is for a non-real-time transmission related to the multimedia service, then the transceiver is further configured to packetize the media data into at least the packet in a predetermined size.

11. The apparatus of claim 8, wherein, in response to determining that the transmission requirement is for a video on demand (VoD) service related to the multimedia service, then the transceiver is further configured to perform at least one of:
packetizing the media data into at least the packet in a predetermined size, or
packetizing the media data into at least the packet by inserting a control information payload therein at intervals of at least one MPU.

12. The apparatus of claim 11, wherein, in response to determining that the transmission requirement is for a quality of service (QoS) guaranteed VoD service, the transceiver is further configured to packetize the media data into at least the packet by inserting the control information payload therein at the intervals of at least one MPU.

13. A method for receiving media data in a multimedia system, the method comprising:
receiving packetized media data generated based on a transmission requirement for the media data and a basic transmission unit for the media data generated based on a packet header format for the media data;
obtaining the media data from the packetized media data; and
determining whether the transmission requirement is for a real-time transmission related to a multimedia service required by the media data,
wherein the transmission requirement for the media data is identified according to a type of the multimedia service required by the media data, and
wherein, in response to determining that the transmission requirement is for a real-time transmission related to the multimedia service, the media data is packetized into the packetized media data by packetizing the media data into at least the packet by inserting a first control information payload therein between consecutive media fragment units (MFUs) at intervals of at least one MFU, and
wherein the control information payload comprises one of file type (FTYP) information, moving picture experts group (MPEG) media processing unit (MMPU) configuration information, or movie (MOOV) codec configuration information.

14. An apparatus for receiving media data in a multimedia system, the apparatus comprising:
a transceiver configured to receive packetized media data which is generated based on a transmission requirement for the media data and a basic transmission unit for the media data generated based on a packet header format for the media data; and a controller configured to:
obtain the media data from the packetized media data, and
determine whether the transmission requirement is for a real-time transmission related to a multimedia service required by the media data,
wherein the transmission requirement for the media data is identified according to a type of the multimedia service required by the media data, and
wherein, if the transmission requirement is for a real-time transmission related to the multimedia service, the media data is packetized into the packetized media data by packetizing the media data into at least the packet by inserting a first control information payload therein between consecutive media fragment units (MFUs) at intervals of at least one MFU, and
wherein the control information payload comprises one of file type (FTYP) information, moving picture experts group (MPEG) media processing unit (MMPU) configuration information, or movie (MOOV) codec configuration information.

* * * * *